(12) United States Patent
Huang et al.

(10) Patent No.: US 6,868,369 B2
(45) Date of Patent: Mar. 15, 2005

(54) TACHOMETER

(75) Inventors: David Huang, Rancho Santa Margaritor, CA (US); Keith Andreasen, Huntington Beach, CA (US)

(73) Assignee: Innova Electronics Corporation, Fountain Valley, CA (US)

(*) Notice: Subject to any disclaimer, the term of this patent is extended or adjusted under 35 U.S.C. 154(b) by 90 days.

(21) Appl. No.: 10/337,122

(22) Filed: Jan. 6, 2003

(65) Prior Publication Data

US 2004/0133394 A1 Jul. 8, 2004

(51) Int. Cl.$^7$ ............................................. G06F 3/033
(52) U.S. Cl. ................. 702/190; 702/182; 702/189; 702/197
(58) Field of Search ............................... 702/108, 177, 702/182, 189, 190, 197, 57, 79; 123/577, 597; 356/141.3; 701/110, 10; 345/10

(56) References Cited

U.S. PATENT DOCUMENTS

| 6,196,208 B1 | * | 3/2001 | Masters | ....................... 123/597 |
| 6,457,464 B1 | * | 10/2002 | Rapoport et al. | ........... 123/605 |
| 6,721,648 B2 | * | 4/2004 | Masters et al. | ............. 701/110 |

OTHER PUBLICATIONS

Equus Products Inc. Catalog pp. 15–16 (1998).
Equus Products, Inc. Catalog pp. 13–14, 23–24 (1995).
Equus Products, Inc. Brochure, not dated.

* cited by examiner

*Primary Examiner*—Marc S. Hoff
*Assistant Examiner*—Felix Suarez
(74) *Attorney, Agent, or Firm*—Stetina Brunda Garred & Brucker

(57) ABSTRACT

A tachometer used to measure a speed of an engine. The tachometer includes a pickup, a counter circuit, a conversion circuit, an automatic switching device, an indicator and a meter display. The inductive pickup may be disposed around a spark plug wire of the engine to generate a pulse signal in response to a current flowing through the spark plug wire. The pulse signals are then counted by the counter circuit and input to the conversion circuit therefrom. The conversion circuit typically includes a plurality of lookup tables, each having mapped information correlating the pulse signals to the engine speed for a particular number of engine cylinders. The automatic switching device is operative to call up alternate lookup tables, e.g. each time when the electrical system of the engine is turned on. The display may be display the number of engine cylinders called up by the automatic switching device and measured engine speed.

22 Claims, 2 Drawing Sheets

TACHOMETER

CROSS-REFERENCE TO RELATED APPLICATIONS (Not Applicable)

STATEMENT RE: FEDERALLY SPONSORED RESEARCH/DEVELOPMENT (Not Applicable)

BACKGROUND OF THE INVENTION

The present invention relates generally to a tachometer used to detect engine speed, and more particularly, to a universal tachometer operative to measure the speeds of engines with different numbers of cylinders.

Tachometers have been broadly applied to measure the angular velocity, typically measured in units of revolutions per unit (RPM). Among various tachometers, the contactless magnetic pickup tachometers are particularly popular for measuring the engine speed of automobiles. For measuring the engine speed, the magnetic pickup tachometer is typically disposed near an ignition timing wheel made of ferromagnetic material. When each tooth of the ignition timing wheel passes through the magnetic pickup tachometer, a pulse is generated. Normally, either the period of the pulse is measured, or the number of pulses per unit time is counted. According to the number of the teeth for the ignition timing wheel and the measured period or counted pulse, the speed can be obtained.

As the above tachometer has to be installed near the crankshaft of the engine, the installment is difficult and laborious. Therefore, companies have developed tachometers with inductor pickup coupled to coil wires of the engine, avoiding the need to measure the magnetic field induced by the rotation of the crankshaft. However, as the coil wires are not readily accessible in the engines in many new vehicles, the installation may remain difficult.

Further, conventional tachometers are designed for the engine with a specific number of cylinders. To measure the speed of engines with different numbers of cylinders, different tachometers are required. Moreover, in many newer engines, two sparks are generated for each operation cycle for each cylinder. Using the conventional tachometer may incorrectly read the second spark as a separate cycle, doubling the reported engine speed.

BRIEF SUMMARY OF THE INVENTION

The present invention provides a tachometer for measuring the speed of an engine. In one embodiment the tachometer comprises an inductive pickup, a counter circuit, a conversion circuit, an automatic switching device, an indicator and a meter display. The inductive pickup is disposable about a spark plug wire, to detect the current pulses flowing through the spark plug wire and to generate pulse signals in response to the detected current pulses.

The pulse signals are counted by the counter circuit, and the counting result is input to the conversion circuit. The conversion circuit comprises a plurality of lookup tables each including mapped information correlating detected current pulses to the engine speed, for a predetermined number of engine cylinders. The automatic switching device, connected to an electrical system of the engine and the conversion circuit, functions to calibrate the tachometer to the correct number of cylinders. In the presently preferred embodiment, this is regulated by engine turn on. Each time the engine electric system is turned on (over a prescribed time), a respective one of the lookup tables is called up. The number of engine cylinders corresponding to the lookup table called up by the automatic switching device is displayed by the indicator. Therefore, the driver can turn on and off the engine electric system until the lookup table corresponding to the currently operating engine is called up. The measured speed, as corresponds to detected current pulses, is then displayed by the meter display.

The conversion circuit of the tachometer preferably comprises a plurality of lookup tables for various types of engines. Different lookup tables are used for engines with different numbers of cylinders. The tachometer can therefore measure engine speed of vehicles having a different number of cylinders, e.g. 4, 6, 8 cylinders. Further, as many engines fire the spark plug twice within one cycle, a filter may be installed to filter the current for generating the second, i.e. the wasted spark. That is, when the spark plug ignites a second time during one cycle for exhausting unwanted remaining gas, the signal for such ignition is filtered from the pulse count used to determine engine speed. Preferably, the filter is coupled between the inductive pickup and the conversion circuit.

In another embodiment the tachometer comprises a connector, a conversion circuit, an automatic switching device, and a meter display. The connector may be inserted between a terminal of a spark plug and a terminal of an ignition coil of an engine, to pickup a signal upon each current spike generated by the ignition coil. Preferably, the connector is connected intermediate the terminal of the spark plug and the spark plug wire. Alternatively, the connector can also be connected between one end of the spark plug and the mating terminal of the ignition coil. A plurality of converting circuits are provided, each operative to convert the signal into an engine speed, for a dedicated number of cylinders. The automatic switching device is operative to select the converting circuits corresponding the engine being monitored, and the meter display allows the driver to read the engine speed, as converted by the conversion circuit.

In the above tachometer, each of the converting circuits is preferably in the form of a lookup table configured for an engine with a specific number of cylinders. Therefore, the tachometer can be used to measure engine speed for different types of vehicles.

The tachometer may further comprise a filter connected between the connector and the conversion circuit. The filter is operative to filter the signal generated by a current spike lower than a predetermined value, which typically corresponds to a wasted spark.

The tachometer may alternatively comprise both a connector and an inductive pickup disposed around the spark plug wire and operative to receive a pulse signal generated by a current flowing through the spark plug wire. When the tachometer comprises both the connector and the inductive pickup, a prioritizing device may be used to deliver the signal generated from the connector to the conversion circuit prior to delivering the pulse signal generated from the inductive pickup.

By the above structure, the present invention provides a universal tachometer suitable for measuring speed of engines with different numbers of cylinders. Further, for those engines that produce two sparks in each cycle, the second spark, that is, the exhaust spark, or sometimes referred as the 'wasted spark', can be filtered.

BRIEF DESCRIPTION OF THE DRAWINGS

These, as well as other features of the present invention, will become more apparent upon reference to the drawings wherein.

DETAILED DESCRIPTION OF THE INVENTION

Figure 1:
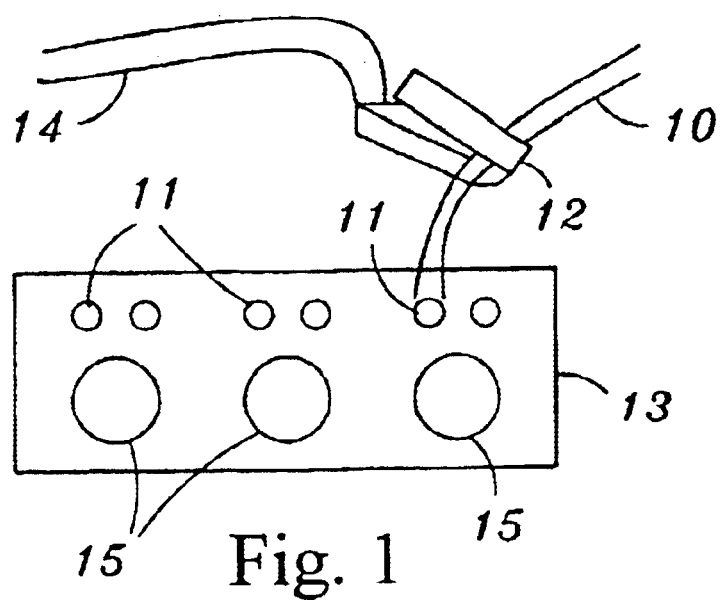
FIG. 1 shows a schematic drawing of the connection between an inductive pickup of a tachometer provided by the present invention and a spark plug wire.

Referring now to the drawings wherein the showings are for purposes of illustrating a preferred embodiment of the present invention only, and not for purposes of limiting the same, FIG. 1 shows a schematic drawing of an inductive pickup of a tachometer disposed about the spark plug wire, in accordance with one embodiment of the present invention.

As shown in FIG. 1, the tachometer includes an inductive pickup 12 disposed around a spark plug wire 10. Spark Plug wire 10 is connected to spark plug 11 secured within engine block 13, to fire into cylinders 15. During each operation cycle of the engine, the air and fuel is mixed and ignited for the compression stroke. For the spark plug to ignite the mixture of air and fuel, a current is generated and flowing through the spark plug wire 10 to provide sufficient energy (voltage) to the spark plug. According to electromagnetic principles, a magnetic field is induced in the inductive pickup 12 when a current is generated and flowing through the spark plug wire 10, or when the current flowing through the spark plug wire 10 is cut off. In other words, the current variation through the spark plug wire 10 induces a magnetic field in the inductive pickup 12. The current variation through the spark plug wire 10 can be presented by a pulse signal. When the speed of the engine is increased, the current varies more frequently, that is, the frequency of the pulse signal generated by the current is higher. When the engine speed is decreased, the frequency of the pulse signal is reduced. Therefore, based on frequency of the pulse signal, the rotation speed of the engine can be measured by the inductive pickup 12.

Figure 2:
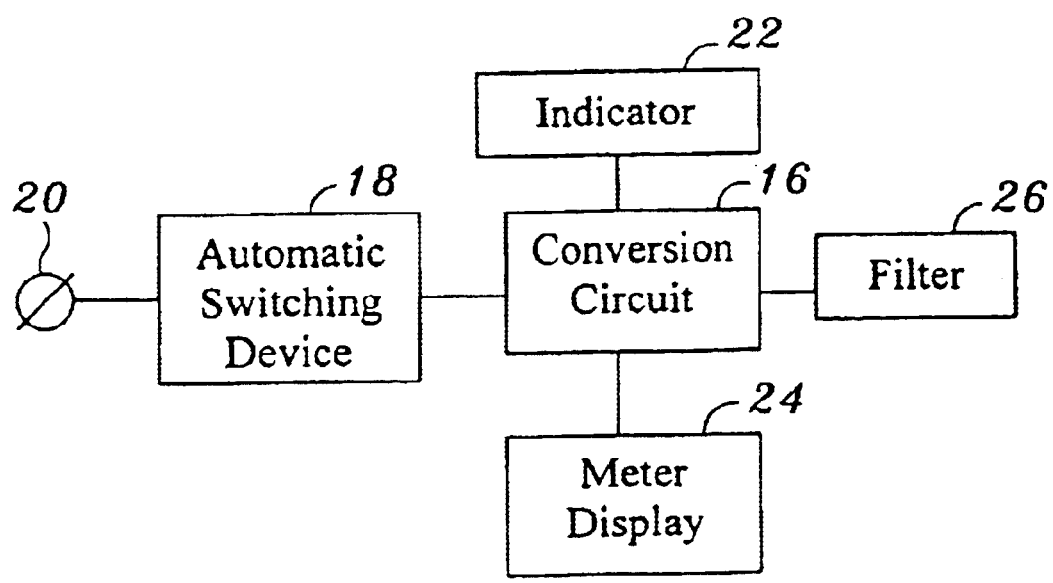
FIG. 2 shows a block diagram of the tachometer provided by the present invention.

In FIG. 1, the inductive pickup 12 is coupled to one end of a pickup wire 14. As shown in FIG. 2, the other end of the pickup wire 14 is coupled to a counter circuit 17, which counts the pulse signal generated by the inductive pickup 12. The counting result is input to the conversion circuit 16, which then converts the frequency or period into appropriate engine speed. In converting the the detected pulse signal into the engine speed, the number of cylinders of the engine is typically determined in advance. Preferably, the conversion circuit 16 includes a database, in which a plurality of lookup tables are installed. For example, the database may comprise separate lookup tables corresponding to the engine with four, six and eight cylinders. Each lookup table provides mapping information correlating the frequency or period of the pulse signals and the revolutions per minute (RPM) of the engine being monitored. The speed of the corresponding engine can therefore be derived from the lookup table.

To select a proper lookup table to correctly convert the characteristic of the pulse signal into the engine speed, the conversion circuit 16 is coupled to an automatic switching device 18. In the presently preferred embodiment, the switching device is response to engine turn on, though other types of switching devices may alternately be used within the broader aspects of the invention. Each time when the driver turns on the main switch 20 of the engine, a different lookup table is addressed. In other words, for each turn-on event of the electric system 20, a respective lookup table is called up for speed measurement. For example, by turning on the electric system once, the lookup table for the four-cylinder engine may be called up. By turning off and on the electric system 20 again, the lookup table for the six-cylinder engine may be called up. By further turning off and on the electric system 20, the lookup table for the eight-cylinder engine is called up. The conversion circuit 14 is further connected to an indicator 22 which may display the lookup table that is currently called up. Therefore, when the tachometer is installed in a car for measuring the engine speed, one can simply turn on and off the electric system 20 until the indicator 22 indicates the lookup table appropriate to obtain a correct measurement of the engine speed for a particular car. The call sequencing may be active for a prescribed period, e.g. ten (10) seconds, after which the sequencing may re-initiate.

As shown in FIG. 2, the tachometer further comprises a meter display 24 connected to the conversion circuit 16, from which the engine speed converted by the conversion circuit 16 can be read. In one embodiment of the present invention, the indicator 22 and the meter display 24 can be integrated into one display device.

In many engines, each spark plug sparks twice in each cycle. For example, for each cycle, the spark plug fires a first time near the top of the compression stroke to initiate the combustion and a second time on the exhaust stroke. The second spark fired by the spark plug is also referred as the exhaust or wasted spark, and the purpose thereof is to expel unwanted gases as quick and functional as possible from the cylinder, such that the fresh intake of air/fuel can be drawn in. Typically, the voltage for generating the first spark is about 35,000 volts, while the voltage required for the exhaust spark is about 5,000 volts. Based on the significant difference of energy requirement, the pulse signal generated by the current supplied to the spark plug has different pulse widths and different amplitudes for these two sparks. The tachometer can thus incorporate a filter 26 to filter pulse signal with a pulse width shorter than a predetermined value. Alternatively, the filter 26 can filter the pulse signal with an amplitude smaller than a predetermined value. For example, the pulse signal with an amplitude than that generated by the current for supplying only about 5000 volts to the spark plug is filtered.

Figure 3:
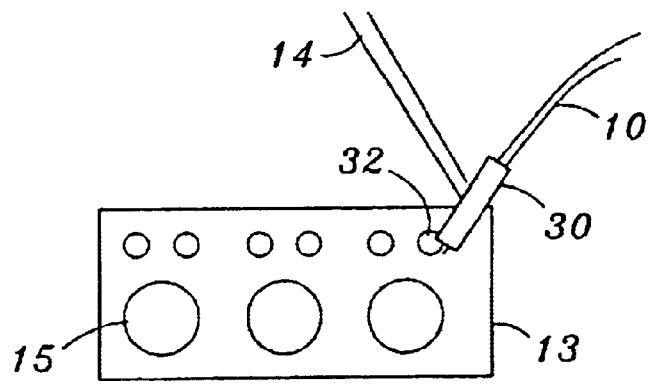
FIG. 3 shows the connection between a direct connector of the tachometer provided by the present invention and a spark plug.

In another embodiment of the present invention, the tachometer may comprise a direct (hard wired) connector 30 rather than the inductive pickup connector 12 clamping around the spark plug wire 10 as shown in FIG. 1. As shown in FIG. 3, the direction connector 30 is connected between a terminal 32 of the spark plug 34 and the spark plug wire 10. Alternatively, the direct connector 30 may be inserted between a terminal of a secondary winding of an ignition coil and the spark plug wire 10. In such manner, a current spike current is directly tapped every time current is supplied from the ignition coil to the spark plug. Based on the current spike current, the engine speed can be derived from the conversion circuit 16 as shown in FIG. 2.

Figure 4:
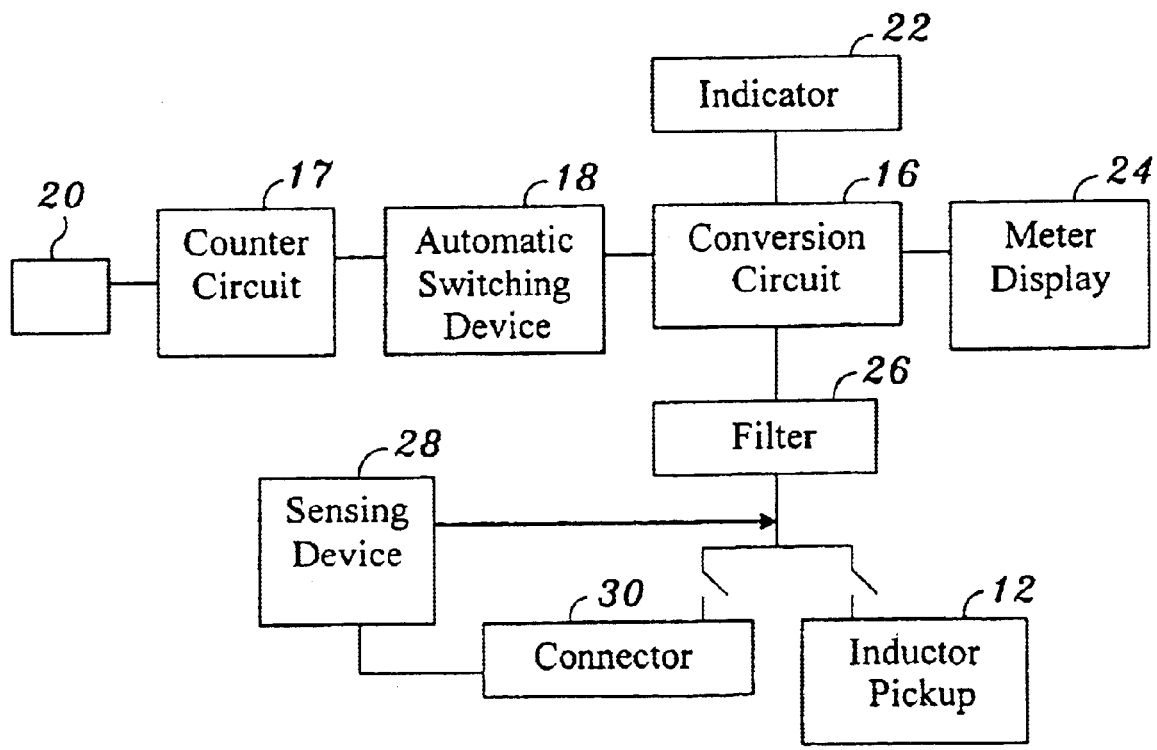
FIG. 4 is a block diagram that illustrates another embodiment of a tachometer provided by the present invention.

In the event that both the direct connector 30 and the inductive pickup connector 14 as shown in FIG. 3 are incorporated in the same tachometer, a sensing circuit 36 is implemented as shown in FIG. 4, by which one of the connectors may be prioritized and the other ignored. The sensing circuit may, for example, check for the presence of current through the direct connector 30 prior to operating on signals from the inductive pickup connector 12.

As shown in FIG. 4, sensing device 28 may be used to detect the whether the direct connector 30 is operative. Once the director connector 30 is determined to be operative, the path between the connector 30 and the conversion circuit 16 is closed and the path between the inductive pickup 12 and the conversion circuit 16 remains open throughout the process. Alternatively, where the sensing device 28 detects that the direct connector 12 is not communicating a the signal in response to the current flowing through, the path between the inductive pickup 12 and the conversion circuit is closed.

Additional modifications and improvements of the present invention may also be apparent to those of ordinary skill in the art. Thus, the particular combination of parts described and illustrated herein is intended to represent only one embodiment of the present invention, and is not intended to serve as limitations of alternative devices within the spirit and scope of the invention.

What is claimed is:

1. A tachometer for measuring the speed of an engine, comprising:
   an inductive pickup disposed about a spark plug wire and operative to detect current pulses flowing through the spark plug wire and to generate pickup pulse signals in response thereto;
   a counter circuit for counting the pulse signals generated by the inductive pickup;
   a conversion circuit, including a plurality of lookup tables, each lookup table having mapped information for deriving and displaying engine speed information from the pickup pulse signals, the mapped information correlating pickup pulse signal frequency to engine speed information for a predetermined number of engine cylinders;
   an automatic switching device, operative to sequentially access one of the lookup tables; and
   a meter display operative to display the engine speed information.

2. The tachometer according to claim 1, further comprising a filter coupled to the inductive pickup for filtering the pulse signals corresponding to exhaust sparks.

3. The tachometer according to claim 2, wherein the filter is operative to filter out pulse signals having a pulse width shorter than a predetermined length.

4. The tachometer according to claim 2, wherein the filter is operative to filter out pulse signals less then a predetermined voltage level.

5. The tachometer according to claim 1, wherein the conversion circuit comprises a plurality of lookup tables each corresponding to an engine having a different number of cylinders.

6. A tachometer operative for measuring the speed of an engine with a predetermined number of engine cylinders, the tachometer comprising:
   a connector, inserted to a terminal of a spark plug and a terminal of an ignition coil of an engine, the connector being operative to tap current spikes generated by the ignition coil, and to generate pickup pulse signals in response thereto;
   a counter circuit for counting the pulse signals generated by the inductive pickup;
   a conversion circuit, including a plurality of converting circuits each being operative to derive engine speed information from the pickup pulse signals, correlating the pickup pulse signals to engine speed information for a predetermined number of engine cylinders;
   an automatic switching device, operative to select one of the converting circuits; and
   a meter display, operative to display the engine speed information.

7. The tachometer according to claim 6, wherein each of the converting circuits includes a lookup table having mapped information correlating the pickup pulse signal frequency to engine speed information for a predetermined number of engine cylinders.

8. The tachometer according to claim 6, further comprising a filter connected to the connector.

9. The tachometer according to claim 6, further comprising a filter operative to filter out pickup pulse signals having an amplitude smaller than a predetermined value.

10. The tachometer according to claim 6, further comprising an inductive pickup disposed around the spark plug wire and operative to generate pickup pulse signals in response to current pulses flowing through the spark plug wire.

11. The tachometer according to claim 10, wherein the inductive pickup is coupled to the conversion circuit.

12. The method according to claim 10, further comprising a sensing device operative to sense the presence of pickup pulse signals from the connector to the conversion in response thereto and to selectively block pickup pulse signals from the inductive pickup, the blocked signals substantially corresponding to exhaust sparks.

13. A tachometer for measuring the speed of an engine, comprising:
   an inductive pickup disposed about a spark plug wire and operative to detect current pulses flowing through the spark plug wire and to generate pickup pulse signals in response thereto;
   a counter circuit for counting the pulse signals generated by the inductive pickup;
   a conversion circuit, including a plurality of lookup tables, each lookup table having mapped information correlating pickup pulse signal frequency to engine speed information for a predetermined number of engine cylinders;
   an automatic switching device, operative to sequentially access one of the lookup table;
   a meter display operative to display the engine speed information; and
   a filter coupled to the inductive pickup for filtering the pulse signals corresponding to exhaust sparks, the filter being operative to filter out pulse signals having a pulse width shorter than a predetermined length.

14. The tachometer according to claim 13, wherein the filter is operative to filter out pulse signals corresponding to exhaust sparks.

15. The tachometer according to claim 13, wherein the conversion circuit comprises a plurality of lookup tables each corresponding to an engine having a different number of cylinders.

16. A tachometer operative for measuring the speed of an engine with a predetermined number of engine cylinders, the tachometer comprising:
   a connector, inserted to a terminal of a spark plug and a terminal of an ignition coil of an engine, the connector being operative to tap current spikes generated by the ignition coil, and to generate pickup pulse signals in response thereto;
   a counter circuit for counting the pulse signals generated by the inductive pickup;
   a conversion circuit, including a plurality of converting circuits each being operative to derive engine speed information from the pickup pulse signals, correlating the pickup pulse signals to engine speed information for a predetermined number of engine cylinders;

an automatic switching device, operative to select one of the converting circuits;

a meter display, operative to display the engine speed information;

a filter coupled to the inductive pickup for filtering out signals having a pulse width shorter then a predetermined length, the predetermined length being selected to distinguish exhaust sparks from ignition sparks.

17. The tachometer according to claim 16, wherein each of the converting circuits includes a lookup table having mapped information correlating the pickup pulse signal frequency to engine speed information for a predetermined number of engine cylinders.

18. The tachometer according to claim 16, further comprising a filter connected to the connector.

19. The tachometer according to claim 16, further comprising a filter operative to filter out pickup pulse signals having an amplitude smaller than a predetermined value.

20. The tachometer according to claim 16, further comprising an inductive pickup disposed around the spark plug wire and operative to generate pickup pulse signals in response to current pulses flowing through the spark plug wire.

21. The tachometer according to claim 20, wherein the inductive pickup is coupled to the conversion circuit.

22. The method according to claim 20, further comprising a sensing device operative to sense the presence of pickup pulse signals from the connector to the conversion in response thereto and to selectively block pickup pulse signals from the inductive pickup, the blocked signals substantially correlating to exhaust sparks.

* * * * *